July 4, 1961 B. BARÉNYI 2,991,120
SEDAN TYPE MOTOR VEHICLE WITH RIMMED TOP AND
DOWNWARDLY EXTENDING DRAINAGE MEANS
Filed Oct. 1, 1957 2 Sheets-Sheet 1

INVENTOR
BÉLA BARÉNYI

BY *Dicke and Billig*

ATTORNEYS

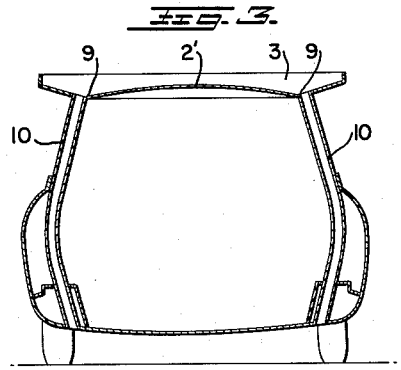
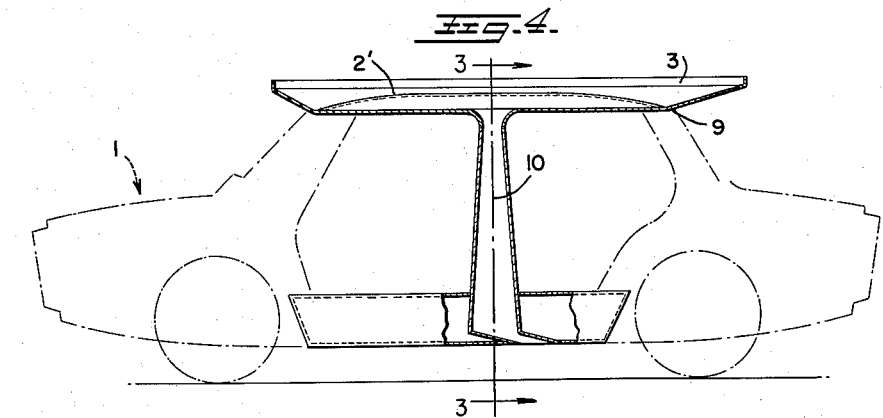
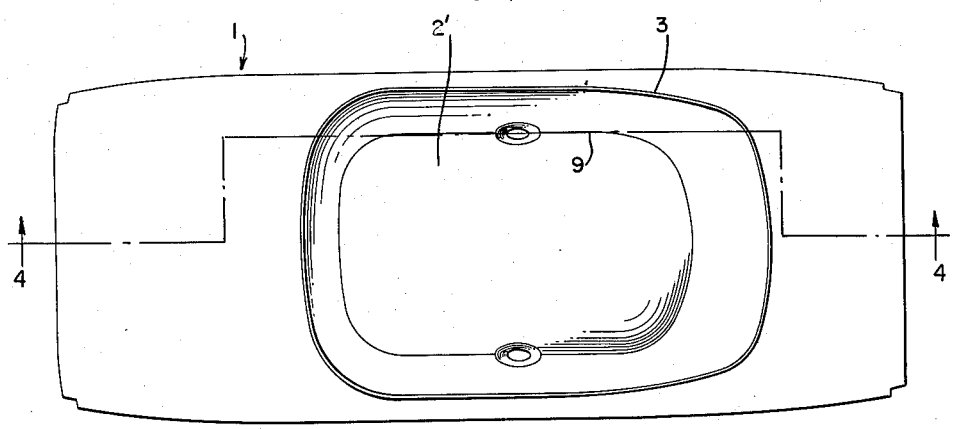

ly to a passenger motor vehicle of the sedan type having a closed vehicle top, and consists essentially therein that the roof of the vehicle top is at least approximately flat and is provided at least on three sides thereof with an upwardly projecting rim or edge portion, thereby enclosing a drainage area of the roof, and that within this rim or edge portion drainage apertures are provided with connecting lines of essentially tubular shape through which water accumulating on the roof may flow off.

United States Patent Office

2,991,120
Patented July 4, 1961

2,991,120
SEDAN TYPE MOTOR VEHICLE WITH RIMMED TOP AND DOWNWARDLY EXTENDING DRAINAGE MEANS
Béla Barényi, Stuttgart-Vaihingen, Germany, assignor to Daimler-Benz Aktiengesellschaft, Stuttgart-Unterturkheim, Germany
Filed Oct. 1, 1957, Ser. No. 687,475
Claims priority, application Germany Oct. 2, 1956
5 Claims. (Cl. 296—137)

The present invention relates to a motor vehicle, especially to a passenger motor vehicle of the sedan type having a closed vehicle top, and consists essentially therein that the roof of the vehicle top is at least approximately flat and is provided at least on three sides thereof with an upwardly projecting rim or edge portion, thereby enclosing a drainage area of the roof, and that within this rim or edge portion drainage apertures are provided with connecting lines of essentially tubular shape through which water accumulating on the roof may flow off.

The present invention offers the advantage that the rain water or melted snow water is collected at predetermined places of the roof and is drained off downwardly in enclosed hidden lines. The use of such a construction prevents that the water, on the one hand, runs off over the lateral walls of the vehicle, namely over the body walls, doors, and particularly over the window panes of the windshield, rear window and door windows, and thereby impairs the vision for the passengers and, on the other, that water drips down from the upper door edge of the vehicle body when the vehicle door is opened.

According to the present invention, a motor vehicle may be advantageously so constructed that the drainage apertures are arranged recessed with respect to the remainder of the roof surface, i.e., at a lower level with respect thereto. For example, the drainage apertures may be arranged in a channel-like recess or indentation of the roof surface and possibly may be each disposed within a funnel-shaped recess.

According to the present invention, the drainage lines may be arranged invisibly, i.e., may be hidden from the ordinary onlooking persons, by locating the drainage apertures over the corners of the vehicle top and by constructing the hollow roof bearer members as drainage lines. For the same purpose, in a motor vehicle with a central hollow cross bearer member or girder essentially carrying the roof of the vehicle top, two drainage apertures may discharge into the leg portions of the cross bearer member and these leg portions may then be constructed as discharge lines in accordance with the present invention. The vehicle superstructure may thereby appropriately be so constructed in accordance with the present invention that the drainage lines discharge within the vehicle body of the vehicle superstructure within the region of the lower edge thereof and that the discharge orifices thereof are appropriately directed rearwardly so as not to become soiled during travel.

The water running off the roof may be collected in accordance with the present invention for different purposes by connecting the discharge lines with one common collecting tank or individual collecting tanks which are provided with appropriate discharge devices. The collecting tanks or containers may thereby be advantageously combined spatially with the hollow bearer members constituting the drainage lines, for example, by being arranged therein.

Accordingly, it is an object of the present invention to provide an arrangement for effectively draining any and all water which may collect on the roof of the top of a motor vehicle, particularly of an essentially flat roof projecting at least on three sides thereof beyond the walls of top lying therebelow.

It is another object of the present invention to provide effective drainage means for the roof of a passenger motor vehicle which is hidden from the bystander.

Still another object of the present invention is to prevent water collecting on the roof from running down along the lateral walls of the top constituted primarily by the windows and windshield of a motor vehicle top to prevent impairment of vision to the passengers which may result therefrom.

Still another object of the present invention is to prevent water collected on the roof of the vehicle from dripping down from the upper edge of the door frame onto the passengers when the vehicle doors are opened.

A still further object of the present invention resides in the provision of a drainage system for the roof, particularly for an essentially flat roof of a motor vehicle which prevents soiling of the system, particularly of the discharge ends thereof, and which permits selective collection of the water thus drained into tanks or reservoirs for different purposes.

Another object of the present invention resides in the provision of a drainage system for the roof which makes advantageous use of the hollow frame bearer constructions supporting the top of the vehicle in which the drainage lines may be appropriately arranged in accordance with the present invention.

These and other objects, features and advantages of the present invention will become more obvious from the following description when taken in connection with the accompanying drawing which shows, for purposes of illustration only, two embodiments in accordance with the present invention and wherein:

FIGURE 3 is a central transverse cross-sectional view through a modified embodiment of a motor vehicle with a drainage system for the roof in accordance with the present invention and taken along line 3—3 of FIGURE 4;

FIGURE 4 is a longitudinal cross-sectional view of the motor vehicle shown in FIGURE 3, taken along line 4—4 of FIGURE 5; and FIGURE 5 is a plan view of the motor vehicle shown in FIGURE 4.

Figure 1:
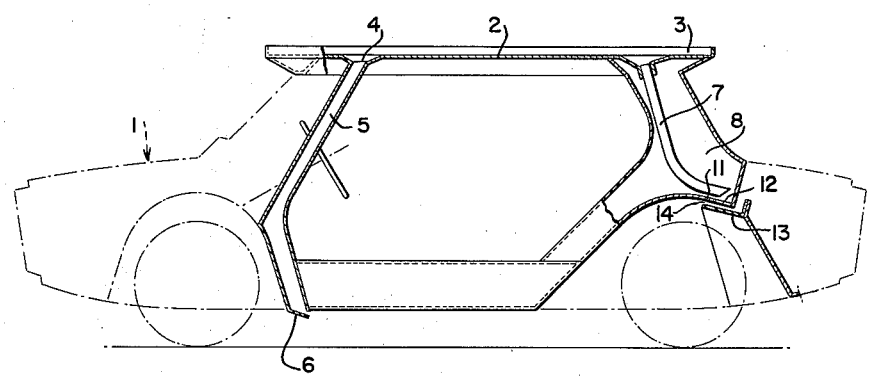
FIGURE 1 is a longitudinal cross-sectional view through a passenger motor vehicle in accordance with the present invention having four water drainage lines arranged at the corners of the vehicle top and taken along line 1—1 of FIGURE 2.

Referring now to the drawing wherein like reference numerals are used throughout the various views to designate like parts, reference numeral 1 generally designates the vehicle body of a passenger motor vehicle, for example, of pontoon-shape, and provided with a closed top, the roof of which is at least approximately flat and extends over the lateral walls of the vehicle top constituted by the different windows thereof, such as windshield, door windows, and rear window, as well as by the body walls thereof. The roof surface 2 is limited by an upwardly projecting rim or edge portion 3.

Figure 2:
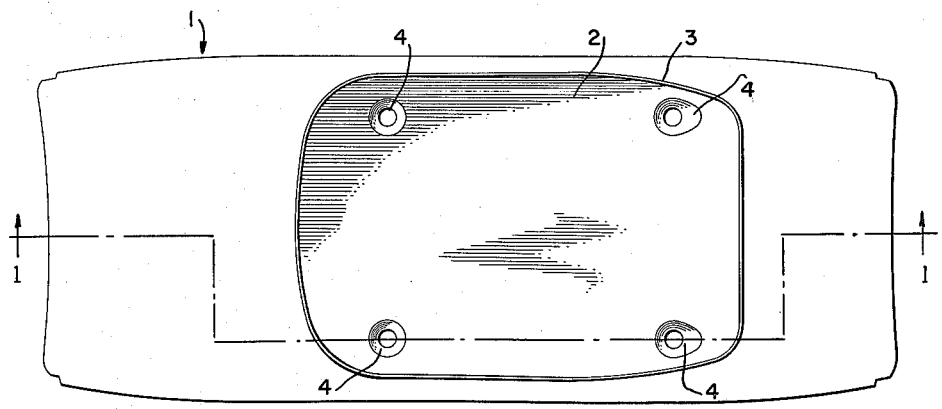
FIGURE 2 is a plan view of the motor vehicle in accordance with FIGURE 1.

In the embodiment of the present invention according to FIGURES 1 and 2, four funnel-shaped recesses 4 are arranged within the roof surface 2 over the corners of the top which recesses 4 each discharge into an aperture. Two hollow vertical or upright bearer members 5 adjoin and are connected with the two front recesses 4 which bearer members 5 may be, for example, angularly shaped as seen in side view. These two hollow bearer members 5 thereby serve directly as drainage lines for any rain or snow water which may collect in the front recesses 4, and may, therefore, be treated accordingly to prevent rusting thereof by any conventional means. The orifices of these lines are disposed, for example, at the height of the lower edge of the vehicle superstructure or body and may be protected by means of a valve member 6 against penetration of dirt or the like.

One tubular line 7 each is connected with a respective one of the two rear recesses 4, of which one each is disposed within a respective hollow vertical bearer member 8. The lines 7 discharge within the body of the vehicle superstructure or chassis in the rear part thereof, for example, within the wheel fenders. The lines 7 may thereby discharge within the double-walled structure of the vehicle body in the rear part of the vehicle toward the outside of the vehicle, for example, in the upper limiting wall of the wheel housing. For that purpose an aperture 12 is provided in the upper wall 11 of each of the rear wheel housings through which the rain water may flow into the respective wheel housing for drainage toward the outside. In order to prevent that the apertures 12 become clogged up by the dirt thrown up by the rear wheels, the rear continuation 13 of the upper wall 11 of each wheel housing is so constructed and arranged that it covers the respective aperture from below, however, a gap 14 remains between the parts 11 and 13 through which the water may flow off into a wheel housing.

In the embodiment illustrated in FIGURES 3 to 5 in accordance with the present invention, the roof surface 2' is arched slightly convexly and the outwardly projecting roof rim or edge portion, provided with the flanged rim 3, is slightly inclined upwardly so that the roof surface 2' is surrounded by a channel-shaped recess 9. The roof 2' of the vehicle top is carried in this embodiment by two vertical bearer members 10 which are disposed in the central transverse plane of the vehicle. Of course, the vertical bearer members 10 may be joined at the roof by a cross bearer member to form an essentially U-shaped roof support bearer member. The vertical bearer members 10 are again constructed as hollow bearer members and terminate with the upper ends thereof within the roof channel 9. The hollow bearer members 10 thereby serve also as drainage lines for the rain and snow water which may collect in the channel 9 of the roof. At the lower ends thereof, the hollow bearer members 10 are provided shortly before the discharge orifices thereof with rearwardly directed angularly bent portions which discharges the drain water toward the rear and thereby prevent dirt from collecting at the orifice.

While the motor vehicle including the frame and roof constructions, has been shown only schematically herein, it is understood that the same may be constructed in any conventional manner. For example, the roof may be constructed as more fully described and shown in my copending application Serial No. 687,520, filed October 1, 1957, and entitled "Roof Construction for a Motor Vehicle," while the vertical bearer members of the frame of the motor vehicle may be appropriately constructed as more fully shown and described in my copending application Serial No. 687,519, filed October 1, 1957, and entitled "Vehicle Frame Construction."

While I have shown and described two embodiments in accordance with the present invention, it is understood that the same is not limited thereto but is susceptible of many changes and modifications within the broad concept thereof, and I, therefore, intend to cover all such changes and modifications as encompassed in the appended claims.

I claim:
1. A motor vehicle, especially a passenger motor vehicle, having a closed top with a roof having a substantially horizontal upwardly-facing roof surface, limiting means disposed on said upwardly-facing roof surface and enclosing a drainage area thereof on at least three sides, said limiting means comprising a rim portion projecting upwardly from and above said upwardly-facing roof surface and outwardly beyond said drainage area, said rim portion having parts extending longitudinally of said roof surface and having further parts connecting said longitudinally extending parts comprising a part extending transversely of said upwardly-facing roof surface, drainage means including water drainage apertures in said roof and drainage lines within the vehicle connected with said apertures and adapted to drain water collecting in said drainage area downwardly through the vehicle.

2. A motor vehicle according to claim 1, wherein said drainage area of said roof is provided with a channel-like recess spaced from said rim portion, and wherein said drainage apertures are located within said channel-like recess.

3. A motor vehicle according to claim 1, further comprising hollow bearer means supporting said roof, said drainage lines being located within said hollow bearer means.

4. A motor vehicle according to claim 1, further comprising a plurality of hollow bearer members disposed within the corners of said top for supporting said roof, and wherein said drainage apertures are connected with said hollow bearer members to thereby drain off the water collected on said roof surface through said bearer members.

5. A motor vehicle according to claim 1, having a superstructure with a lower edge, wherein said drainage lines discharge within the region of said lower edge, the discharge portions of said drainage lines being bent rearwardly to prevent soiling.

References Cited in the file of this patent
UNITED STATES PATENTS

| 1,328,383 | Ludlow | Jan. 20, 1920 |
| 1,511,172 | McArthur | Oct. 7, 1924 |
| 2,556,062 | Buehrig | June 5, 1951 |
| 2,569,724 | Markie | Oct. 2, 1951 |
| 2,576,354 | Oswald | Nov. 27, 1951 |

FOREIGN PATENTS

| 27,506 | Finland | June 30, 1955 |
| 436,458 | Great Britain | Oct. 11, 1935 |
| 719,218 | Great Britain | Dec. 1, 1954 |
| 84,531 | Sweden | Oct. 8, 1935 |